US008995045B2

(12) United States Patent
Tatsuta et al.

(10) Patent No.: US 8,995,045 B2
(45) Date of Patent: Mar. 31, 2015

(54) IMAGE DISPLAY APPARATUS

(71) Applicants: Shinichi Tatsuta, Tokyo (JP); Hiroshi Hasegawa, Yokosuka (JP); Hideaki Okano, Yokohama (JP); Takahiro Kamikawa, Tokyo (JP); Taisuke Ogoshi, Sapporo (JP); Toru Kambayashi, Chigasaki (JP); Shinichi Uehara, Tokyo (JP); Masako Kashiwagi, Yokohama (JP)

(72) Inventors: Shinichi Tatsuta, Tokyo (JP); Hiroshi Hasegawa, Yokosuka (JP); Hideaki Okano, Yokohama (JP); Takahiro Kamikawa, Tokyo (JP); Taisuke Ogoshi, Sapporo (JP); Toru Kambayashi, Chigasaki (JP); Shinichi Uehara, Tokyo (JP); Masako Kashiwagi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/729,356

(22) Filed: Dec. 28, 2012

(65) Prior Publication Data

US 2013/0258446 A1 Oct. 3, 2013

(30) Foreign Application Priority Data

Mar. 29, 2012 (JP) ................. 2012-075363

(51) Int. Cl.
 *G02B 26/00* (2006.01)
 *G02B 27/10* (2006.01)
 *G02B 26/02* (2006.01)
 *H04N 13/04* (2006.01)

(52) U.S. Cl.
 CPC ............ *G02B 26/02* (2013.01); *H04N 13/0404* (2013.01); *H04N 13/0415* (2013.01); *H04N 13/0447* (2013.01); *H04N 13/0409* (2013.01)
 USPC .......................................... 359/291; 359/624

(58) Field of Classification Search
 USPC ......... 359/196.1–199.4, 219.2, 291, 619–624
 See application file for complete search history.

(56) References Cited

U.S. PATENT DOCUMENTS

| 6,801,243 | B1 | 10/2004 | Van Berkel |
| 7,400,439 | B2 * | 7/2008 | Holman ......................... 359/298 |
| 2003/0214497 | A1 | 11/2003 | Morishima et al. |
| 2009/0021839 | A1 * | 1/2009 | Wolf et al. .................... 359/621 |
| 2012/0327132 | A1 | 12/2012 | Tatsuta et al. |

FOREIGN PATENT DOCUMENTS

| CN | 102282500 A | 12/2011 |
| JP | 7-36040 A | 2/1995 |
| JP | 8-68961 | 3/1996 |

(Continued)

OTHER PUBLICATIONS

Korean Office Action issued Nov. 29, 2013 in Patent Application No. 10-2012-0154091 with English Translation.
U.S. Appl. No. 14/203,659, filed Mar. 11, 2014, Tatsuta, et al.
Office Action mailed Oct. 2, 2014 in Taiwanese Application No. 101147849 (w/English translation).

(Continued)

*Primary Examiner* — Mahidere Sahle
(74) *Attorney, Agent, or Firm* — Oblon, McClelland, Maier & Neustadt, L.L.P.

(57) ABSTRACT

According to one embodiment, an image display apparatus includes a light source, a modulation unit, a first array and a second array. The modulation unit modulates intensity and a color of the light to generate beams corresponding to each of modulated pixels included in a modulated pixel group. The first array is formed by juxtaposing a plurality of first deflection elements each having a generating line parallel to a vertical direction of the modulated pixels. The second array is formed by juxtaposing a plurality of second deflection elements each having a generating line tilted by an angle represented by $\tan^{-1}(\alpha \times m/n)$ with respect to a generating line of the first deflection element.

17 Claims, 14 Drawing Sheets

(56) References Cited

FOREIGN PATENT DOCUMENTS

| | | |
|---|---|---|
| JP | 2004-48702 | 2/2004 |
| JP | 2007-79253 | 3/2007 |
| JP | 2010-122646 | 6/2010 |
| TW | 201107789 A1 | 3/2011 |
| TW | 201122555 A1 | 7/2011 |

OTHER PUBLICATIONS

Office Action mailed Aug. 5, 2014 in Japanese Application No. 2012-075363 filed Mar. 29, 2012 (w/English translation).

Office Action mailed Sep. 26, 2014 in Korean Application No. 10-2014-97325 (w/English translation).

Office Action mailed Oct. 17, 2014 in Chinese Application No. 201210585122.2 (w/English translation).

\* cited by examiner

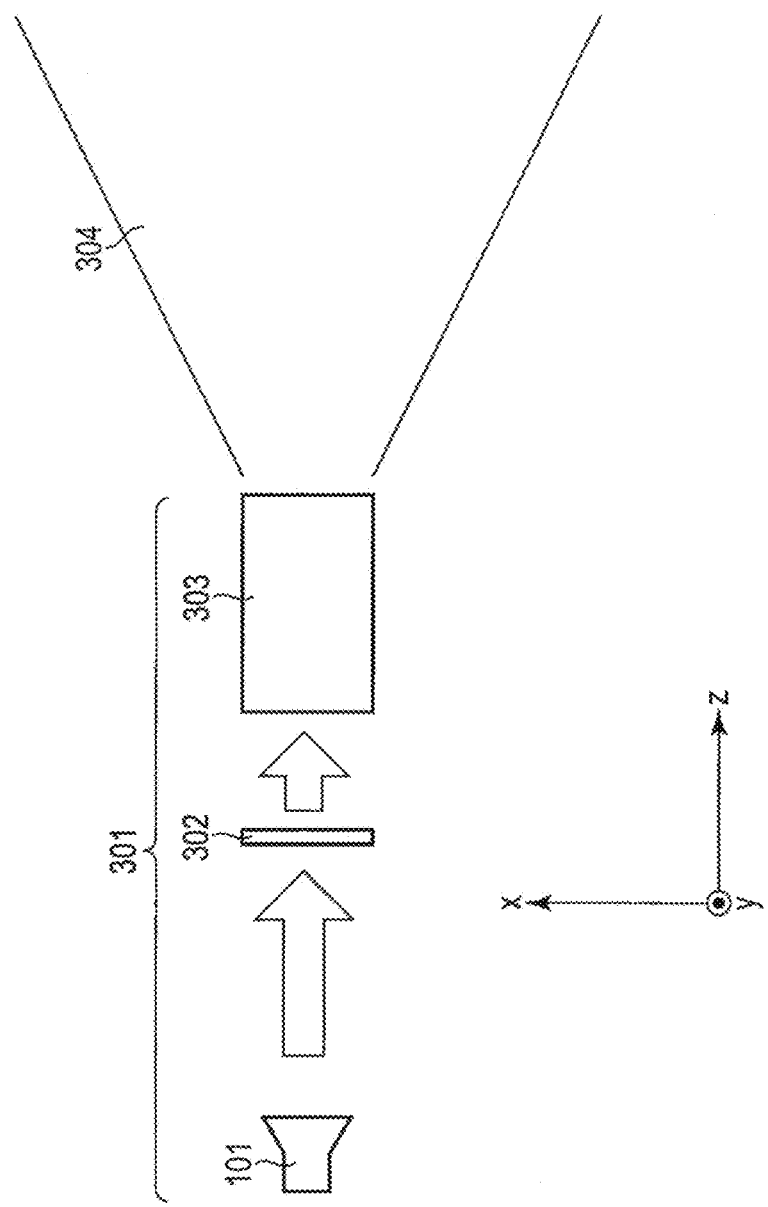
F I G. 3

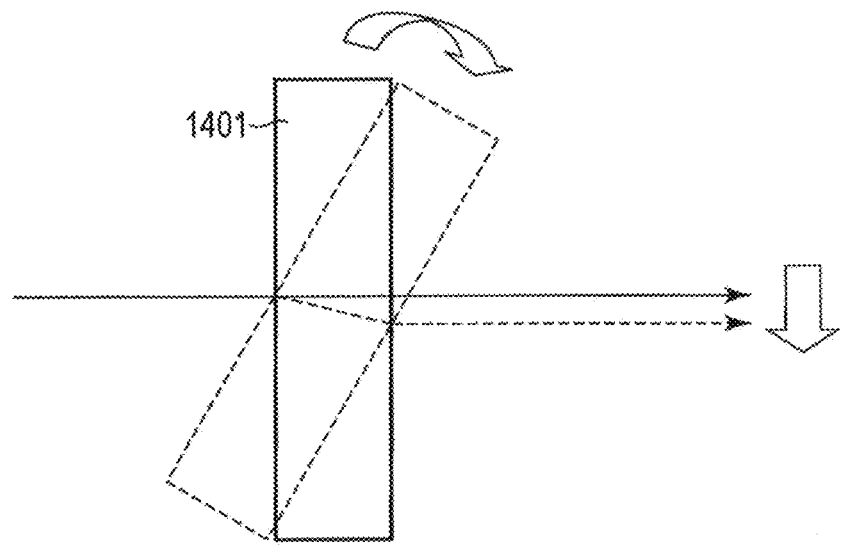
F I G. 14
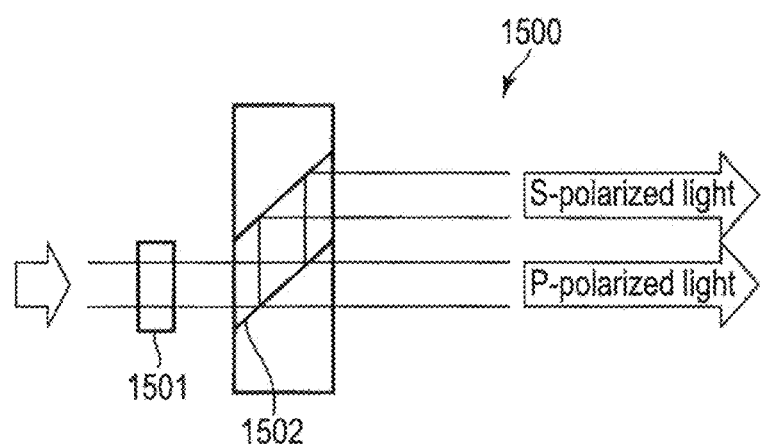
F I G. 15

IMAGE DISPLAY APPARATUS

CROSS-REFERENCE TO RELATED APPLICATIONS

This application is based upon and claims the benefit of priority from Japanese Patent Application No. 2012-075363, filed Mar. 29, 2012, the entire contents of which are incorporated herein by reference.

FIELD

Embodiments described herein relate generally to an image display apparatus.

BACKGROUND

Along with the rapid shift from conventional cathode ray tube monitors to flat panel displays (FPDs) represented by a liquid crystal panel, not only monitors for business use and displays of personal computers but almost all image display apparatuses including TV monitors for general use are being replaced with FPDs. At the same time, efforts have been made to achieve high image quality by full high definition (1920× 1080 pixels) and the like. Under these circumstances, three-dimensional (3D) display has also been developed extensively as a new function, people can enjoy 3D broadcasting and video disks capable of reproducing 3D display at home.

As means for viewing such 3D broadcasting, there exist a viewing method using dedicated glasses and a viewing method not using dedicated glasses but a special display including a lenticular lens or parallax barrier.

BRIEF DESCRIPTION OF THE DRAWINGS

FIG. 3 is a diagram showing a modification of a light source and a light modulation unit;

FIG. 14 is a diagram showing the first example of a pixel shift element; and

FIG. 15 is a diagram showing the second example of the pixel shift element.

DETAILED DESCRIPTION

Figure 1:
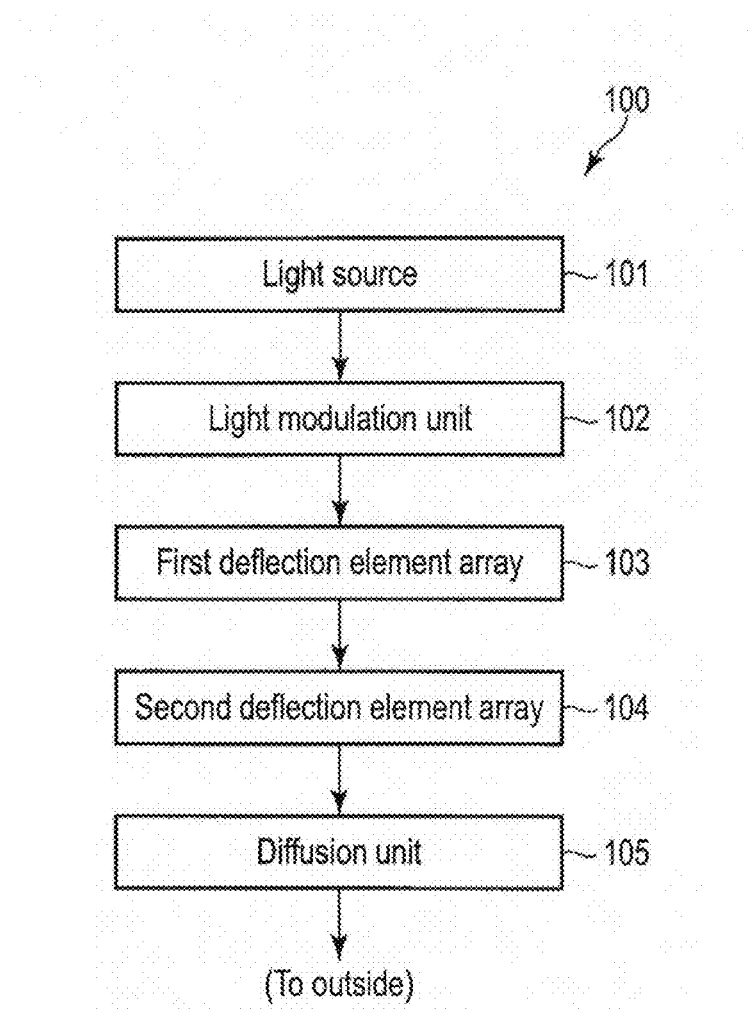
FIG. 1 is a block diagram showing an image display apparatus according to the first embodiment.

As a means for viewing an image of 3D display, the method using glasses incorporating a liquid-crystal shutter, a deflection element, or the like has been put to practical use because of its high compatibility with an FPD, and many products have already been given to the public. In the method using the glasses, two-dimensional (2D) images for the left and right eyes are displayed time-divisionally or alternately for each pixel in the FPD, and switching is done in the glasses such that the image for the left eye strikes the left eye, and the image for the right eye strikes the right eye. Technical burden is relatively light except the necessity of making the frame rate of the FPD twice as high as before and the necessity of separating the left and right images to prevent them from mixing. However, this technique also suffers from the following disadvantages.

The viewer must wear the dedicated eyeglasses to enjoy seeing 3D images. Further, the viewer cannot see 2D images well, while wearing the dedicated eyeglasses to see 3D images. In other words, it is difficult for the viewer to adapt his or her eyes quickly from a 3D image to a 2D image, or vice versa. Still further, 3D images appear doubled to any viewer (user) not wearing the eyeglasses. Thus, the viewer must take off the dedicated eyeglasses in order to view 2D images, and must wear them in order to perceive 3D images. This is a factor that discourages the widespread of 3D programs broadcasting. Furthermore, any viewer who keeps wearing the dedicated eyeglasses and viewing 3D images may have uncomfortable feeling or may be tired. Moreover, the two images the viewer sees at the left and right eyes, respectively, do not change even if the viewer moves. Consequently, motion parallax, which changes these images as the viewer moves, cannot be obtained at all.

To avoid these disadvantages, a display has been developed based on a technology such as a lenticular lens or parallax barrier, allowing the user to view without glasses or obtain motion parallax by increasing the number of parallaxes. In this method, however, the increase in the number of parallaxes is limited because the FPD to be used needs to raise the resolution as the number of parallaxes increases. When the number of parallaxes is small, a viewing region where a natural stereoscopic view can be obtained becomes small. Hence, the viewing region is restricted.

In general, according to one embodiment, an image display apparatus includes a light source, a modulation unit, a first array and a second array. The light source emits light. The modulation unit is configured to modulate an intensity of the light and a color of the light to generate beams corresponding to each of modulated pixels included in a modulated pixel group, the modulated pixels is each determined by an observation position where an image is observed and an output angle corresponding to the observation position, the modulated pixel group is the modulated pixels arrayed two-dimensionally. The first array is formed by juxtaposing a plurality of first deflection elements each having a generating line parallel to a vertical direction of the modulated pixels and is configured to deflect the beams for each first modulated pixel group corresponding to m columns in the modulated pixel group to generate a first deflected beams, the m is a natural number. The second array is formed by juxtaposing a plurality of second deflection elements each having a generating line tilted by an angle represented by $\tan^{-1}(\alpha \times m/n)$ with respect to a generating line of the first deflection element and is configured to deflect the first deflected beams for each second modulated pixel group corresponding to n rows in the first modulated pixel group to generate a second deflected beams, the $\alpha$ is a ratio of a horizontal pixel interval to a vertical pixel interval of each modulated pixel, the n is a natural number.

In the following, the image display apparatus according to the present embodiments will be described in details with reference to the drawings. In the embodiments described below, modules specified by the same reference number carry out the same operation, and may only be explained once.

First Embodiment

An image display apparatus according to the first embodiment will be described with reference to the block diagram of FIG. 1. An image display apparatus 100 according to the first embodiment includes a light source 101, a light modulation unit 102, a first deflection element array 103, a second deflection element array 104, and a diffusion unit 105.

The light source 101 is a light-emitting element such as a laser diode (LD), and emits light. From the viewpoint of low power consumption, a light-emitting diode (LED) or an organic electroluminescent source or LD is preferably used. An LD is preferable from the viewpoint of color reproduction, reducing the beam diameter, and optimizing parallax generation by adjusting the beam emission angle and width. In either case, light that enters the light modulation unit 102 preferably has high directionality with a small beam spread angle.

Note that a solid-state laser, a gas laser, or second harmonic generation (SHG) may be used, or a light-emitting element such as a halogen lamp or a mercury lamp used in a normal general-purpose projector may be used.

The light modulation unit 102 is, for example, a spatial light modulator (SLM). A liquid crystal panel (for example, LCOS) of flat panel type is usable. The light modulation unit 102 receives light from the light source 101 and modulates the light to generate a beam corresponding to a modulated pixel.

The first deflection element array 103 is a so-called lenticular lens in which a plurality of, for example, cylindrical lenses are juxtaposed as first deflection elements to form a sheet. The first deflection element array 103 deflects the beam that has entered from the light modulation unit 102 in correspondence with each modulated pixel. The deflected beam will also be referred to as a first deflected beam. Details of the first deflection element array 103 will be described later with reference to FIG. 4.

The second deflection element array 104 is a lens in which a plurality of cylindrical lenses are juxtaposed as second deflection elements to form a sheet, almost like the first deflection elements. However, unlike the first deflection element array 103, the generating line of a second deflection element tilts by a predetermined angle with respect to that of the first deflection element array 103. The second deflection element array 104 further deflects each first deflected beam that has entered from the first deflection element array 103. The beam deflected by the second deflection element array 104 will be referred to as a second deflected beam. Details of the second deflection element array 104 will be described later with reference to FIG. 6.

The diffusion unit 105 is, for example, an anisotropic light diffusion plate, and is made of a material that has a large vertical light diffusion angle and a small horizontal light diffusion angle or does not diffuse light horizontally. When the second deflected beams that have entered from the second deflection element array 104 pass through the diffusion unit 105, parallax images are generated at an external observation position. Hence, the user can view the parallax images (3D image) at the observation position.

An example of the detailed arrangement of the image display apparatus according to the first embodiment will be described next with reference to FIG. 2.

Figure 2:
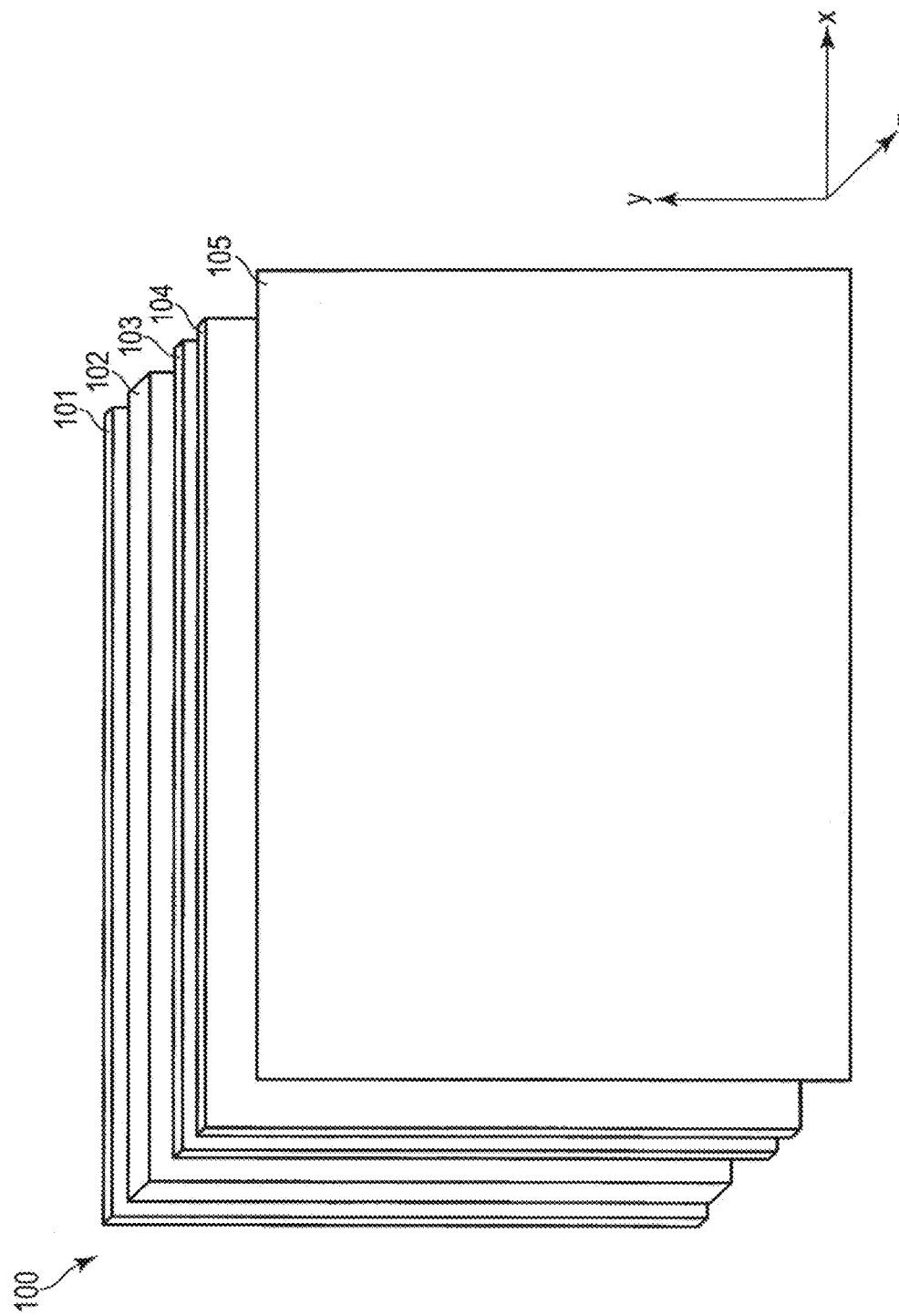
FIG. 2 is a diagram showing an example of the detailed arrangement of the image display apparatus according to the first embodiment.

The light source 101, the light modulation unit 102, the first deflection element array 103, the second deflection element array 104, and the diffusion unit 105 are arranged sequentially from the far side of the depth direction (+z direction in FIG. 2). Assume that each component is formed from one flat plate, as shown in FIG. 2. Note that the first deflection element array 103, the second deflection element array 104, and the diffusion unit 105 are preferably thin as long as they can hold the shapes. However, when they are thin, the strength may be increased by stacking and bonding them on a substrate such as a glass plate to hold the shapes.

A modification of the light source 101 and the light modulation unit 102 will be described next with reference to FIG. 3. A modification of the light source 101 and the light modulation unit 102 is a projector. A projector 301 includes the light source 101, a two-dimensional spatial light modulator 302, and a projector lens 303. The projector 301 projects light that has passed through the two-dimensional spatial light modulator 302 externally as a beam of a 2D image via the projector lens 303. A beam 304 of the 2D image projected via the projector lens 303 enters the first deflection element array 103 and then sequentially enters the second deflection element array 104 and the diffusion unit 105, as shown in FIG. 1.

Note that the projector may be a scan type projector that obtains the same effect as the 2D image projection by scanning a beam, although not illustrated. The projector lens 303 may be formed from a group of a plurality of lenses. To adjust or eliminate the difference in the incidence angle between the pixels, a deflection member, for example, a lens such as a Fresnel lens or a prism array may be arranged between the projector lens 303 and the first deflection element array 103. A plurality of two-dimensional spatial light modulators 302 may be provided. For example, to obtain a color display, three two-dimensional spatial light modulators corresponding to red, green, and blue may be combined with a prism or the like.

The positional relationship between the first deflection element array 103 and beams corresponding to the modulated pixels in the light modulation unit 102 will be described next with reference to FIG. 4.

Figure 4:
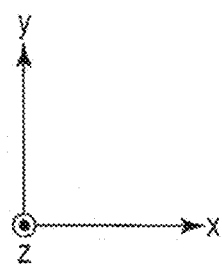
FIG. 4 is a diagram showing the positional relationship between modulated pixels and a first deflection element array according to the first embodiment.

FIG. 4 illustrates part of the first deflection element array 103 and beams which correspond to the modulated pixels and enter the first deflection element array 103. Each region surrounded by a thick line represents a pixel displayed in a display unit (not shown) and will be referred to as a display pixel 401 hereinafter. Each of 64 regions in 8 rows×8 columns in the display pixel 401 represents a modulated pixel 402 for which the light has been modulated by the light modulation unit 102. The modulated pixel 402 is determined by the observation position where the image is observed and the output angle corresponding to the observation position. The light intensity and color are set in accordance with the image to be displayed. The 64 modulated pixels 402 are numbered 1 to 64 for the descriptive convenience.

The curves of broken lines represent the outlines of the surface shapes of first deflection elements 403-1 to 403-3 out of the first deflection elements included in the first deflection element array 103. In this embodiment, a cylindrical lens is used as each deflection element 403, and the broken line indicates the outline of the surface shape of the cylindrical lens. One first deflection element 403 has a size corresponding to eight modulated pixels 402 (eight columns) horizontally (x-axis direction in FIG. 4) and one column of the whole region of the display pixels 401 vertically (y-axis direction in FIG. 4). That is, when the whole display pixel region is formed from display pixels in 1080 rows×1920 columns (1080×1920 display pixels), one first deflection element 403 has a size corresponding to a region of display pixels in 1080 rows×1 column.

The boundary line between the first deflection elements (for example, the line between the first deflection element 403-1 and the first deflection element 403-2) matches the vertical line of the boundary between the display pixels 401. The generating line of each first deflection element is parallel to the vertical direction of the modulated pixels that form the display pixels 401. The cylindrical lens used in this embodiment can have a convex surface either on one side or on both sides. The convex surface can be located either on the side facing the light modulation unit 102 or on the side facing the second deflection element array 104. Not a convex lens but a concave lens may be used to obtain the same characteristics.

In this embodiment, the description will be made assuming that the number of parallaxes is 64, the modulated pixels are formed in 8 rows×8 columns, and the intervals between the modulated pixels are constant and equal in the vertical and horizontal directions, unless otherwise specified. However, the embodiment is not limited to this. For example, the number of parallaxes may be 144 (12×12 modulated pixels), and any other cases are considerable.

A modification of the deflection element according to this embodiment will be described next with reference to FIG. 5.

Figure 5:
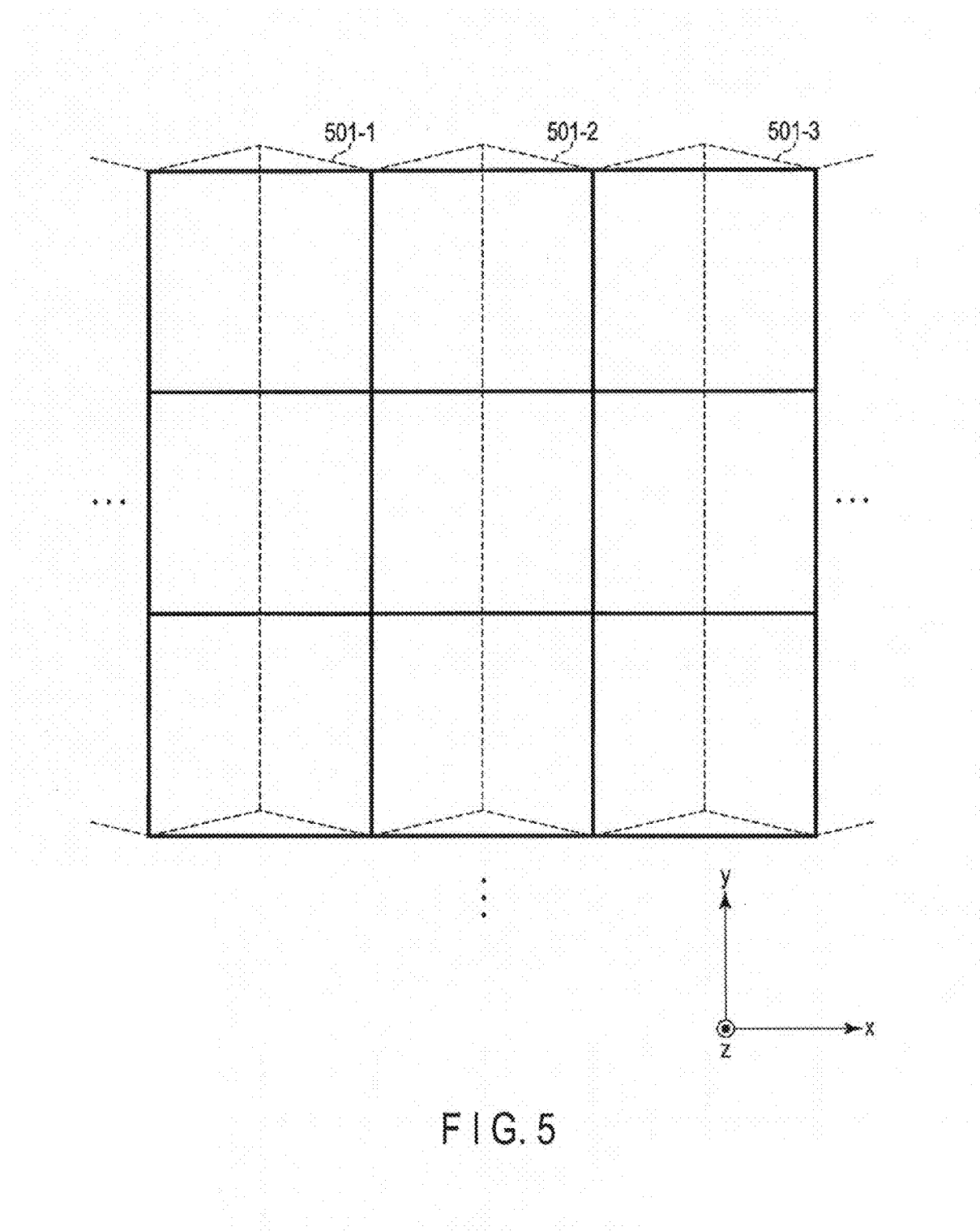
FIG. 5 is a diagram showing a modification of a deflection element.

A prism as shown in FIG. 5 may be used in place of the cylindrical lens. When prisms 501-1 to 501-3 are adjacently arranged as the first deflection element array 103, the same effect as that of the cylindrical lenses can be obtained. Note that a prism having two or more surfaces, a diffraction grating, or any other shape is usable. It is necessary only to obtain the deflection effect of compressing the width of the 64 modulated pixels 402 of a display pixel 401 and making light enter the second deflection element array 104. However, if the number of columns of modulated pixels corresponding to one display pixel 401 is neither equal to the number of surfaces of the prism nor a multiple thereof, the modulated pixels overlap the boundary of the surfaces of the prism. This may lead to unintended generation of undesired light. Hence, when using a prism, the number of columns of modulated pixels corresponding to one display pixel 401 is preferably equal to the number of surfaces of the prism or a multiple thereof. In the example shown in FIG. 5, the number of surfaces of the prism that does not face the modulated pixels is 2, and the number of columns of 64 modulated pixels corresponding to one display pixel 401 is 8. Since the number of columns of the modulated pixels is a multiple (four times) of the number of surfaces of the prism, generation of undesired light can be suppressed.

The positional relationship between the second deflection element array 104 and first deflected beams that have passed through the first deflection element array 103 according to the first embodiment will be described next with reference to FIG. 6.

The modulated pixel beams that have passed through the first deflection element array 103 are deflected into first deflected beams in 8 rows×1 column, that is, one vertical column by compressing the width (column direction) of the pixels in 8 rows×8 columns. Referring to FIG. 6, each pixel beam is represented by a square cell, for convenience in numbering. Actually, the width is compressed. A beam will sometimes be represented in the same way hereinafter, unless specifically stated otherwise.

Figure 6:
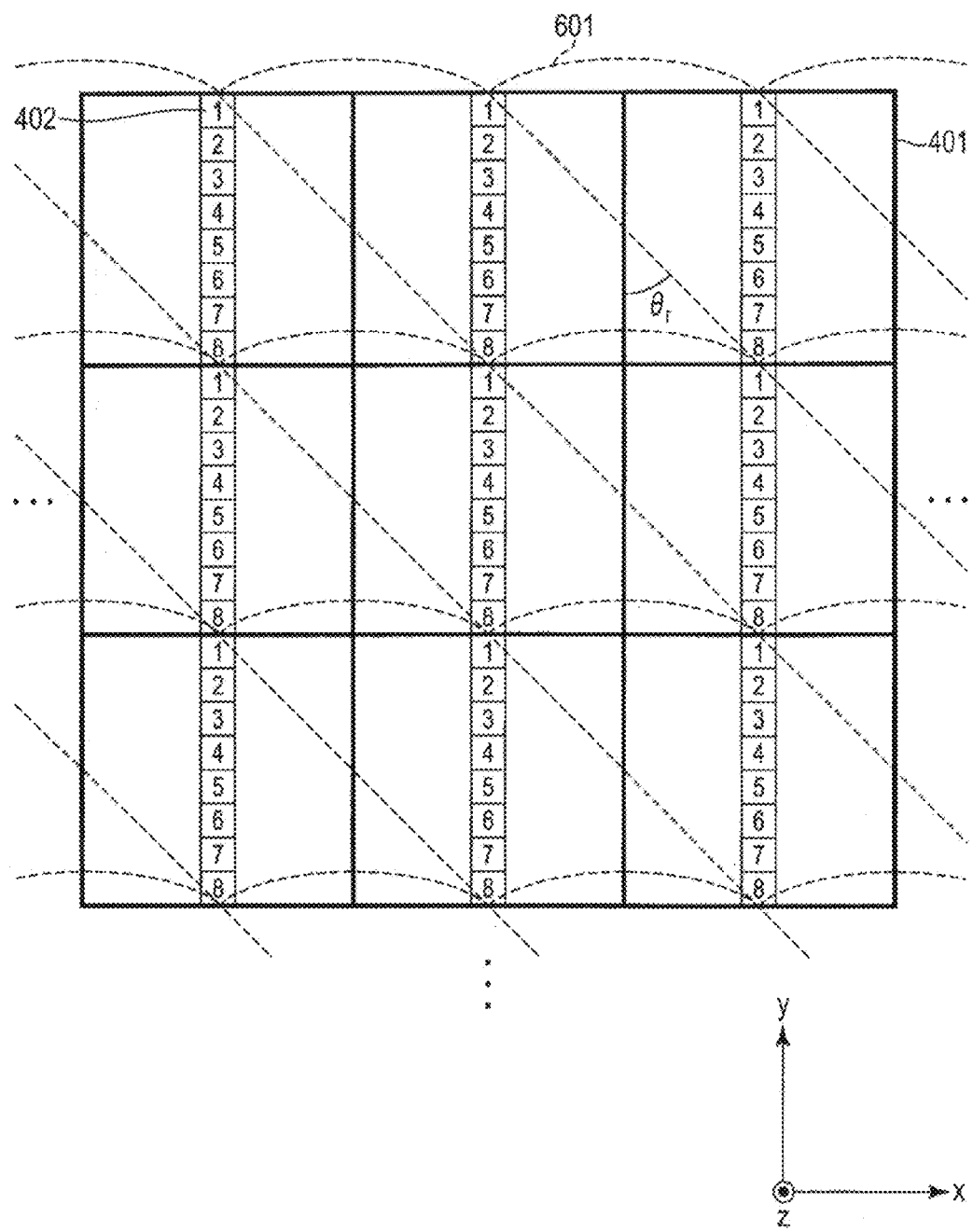
FIG. 6 is a diagram showing the positional relationship between a second deflection element array and first deflected beams that have passed through the first deflection element array.

Beams of modulated pixels in 8 columns overlap at the position of one number of modulated pixel 402 shown in FIG. 6. For example, the beams of modulated pixels numbers 1, 9, 17, 25, 33, 41, 49, and 57 in FIG. 4 overlap at the position of the modulated pixel of number 1 in FIG. 6. The beams of modulated pixels numbers 8, 16, 24, 32, 40, 48, 56, and 64 overlap at the position of the modulated pixel of number 8. If the shift is uniform the numerical order does not change, the beams may overlap with a shift. If a shift occurs, the shift amount is preferably as small as possible.

The broken lines in FIG. 6 represent the outlines of deflection elements 601 of the second deflection element array 104. The generating line of each second deflection element 601 tilts by 45° with respect to those of the first deflection elements. In addition, the display pixels 401 are arranged not to cross the boundaries between the second deflection elements.

That is, since the generating line of the first deflection element 403 and the y-axis direction boundary line between the display pixels 401 are parallel. For this reason, the tilt angle (that is, angle $\theta_r$) of the generating line of the second deflection element 601 with respect to that of the first deflection element 403 is 45° in FIG. 6. In addition, a set of incident positions of the modulated pixel beams concerning numbers 1 to 8 is within the region of one second deflection element. The horizontal (x-axis direction) interval between the second deflection elements equals the horizontal (x-axis direction) interval between the first deflection elements.

Note that when a display pixel is formed from not modulated pixels in 8 rows×8 columns but modulated pixels in n rows×m columns (n and m are different natural numbers), the tilt angle $\theta_r$ of the generating line of the second deflection element 601 with respect to that of the first deflection element can be given by $$\theta_r = \tan^{-1}(m/n) \quad (1)$$

However, when m=n, it is possible to prevent the modulated pixels from crossing the boundaries between the second deflection elements and make the display pixel interval equal to the modulated pixel interval in the vertical and horizontal directions. For this reason, m=n is preferable. The pixel interval represents the pixel pitch. If the modulated pixels have different vertical and horizontal intervals, the tilt angle changes in accordance with the ratio. That is, letting a be the ratio of the modulated pixel interval horizontally to that vertically, the angle $\theta_r$ is given by $$\theta_r = \tan^{-1}(\alpha \times m/n) \quad (2)$$

An error in the angle caused by a manufacturing error or misregistration in adjustment is allowable as long as the modulated pixels can be arranged without crossing the boundaries between the second deflection elements, and the horizontal alignment order of the modulated pixel beams that finally exit from the diffusion unit 105 rarely shifts.

Note that as the second deflection element array 104, normally, a lenticular lens formed from cylindrical lenses is used. The cylindrical lens can have a convex surface either on one side or on both sides, as in the first deflection element array 103. The convex surface can be located either on the side facing the light modulation unit 102 or on the side facing the diffusion unit 105. A concave lens may be used to obtain the same characteristics. To suppress the spread angle of a pixel beam that exits from the second deflection element array 104 and suppress overlap of the pixel beams horizontally, a prism that has, on one side, surfaces as many as the columns of the modulated pixels corresponding to one display pixel 401 may be used in place of the cylindrical lens. A diffraction grating or any other shape is also usable. That is, it is necessary only to deflect the modulated pixel beams that have entered the positions of the modulated pixels having numbers 1 to 8 in different directions.

The deflected states of the modulated pixels by the first deflection element array and the second deflection element array will be described next with reference to FIGS. 7 and 8.

Figure 7:
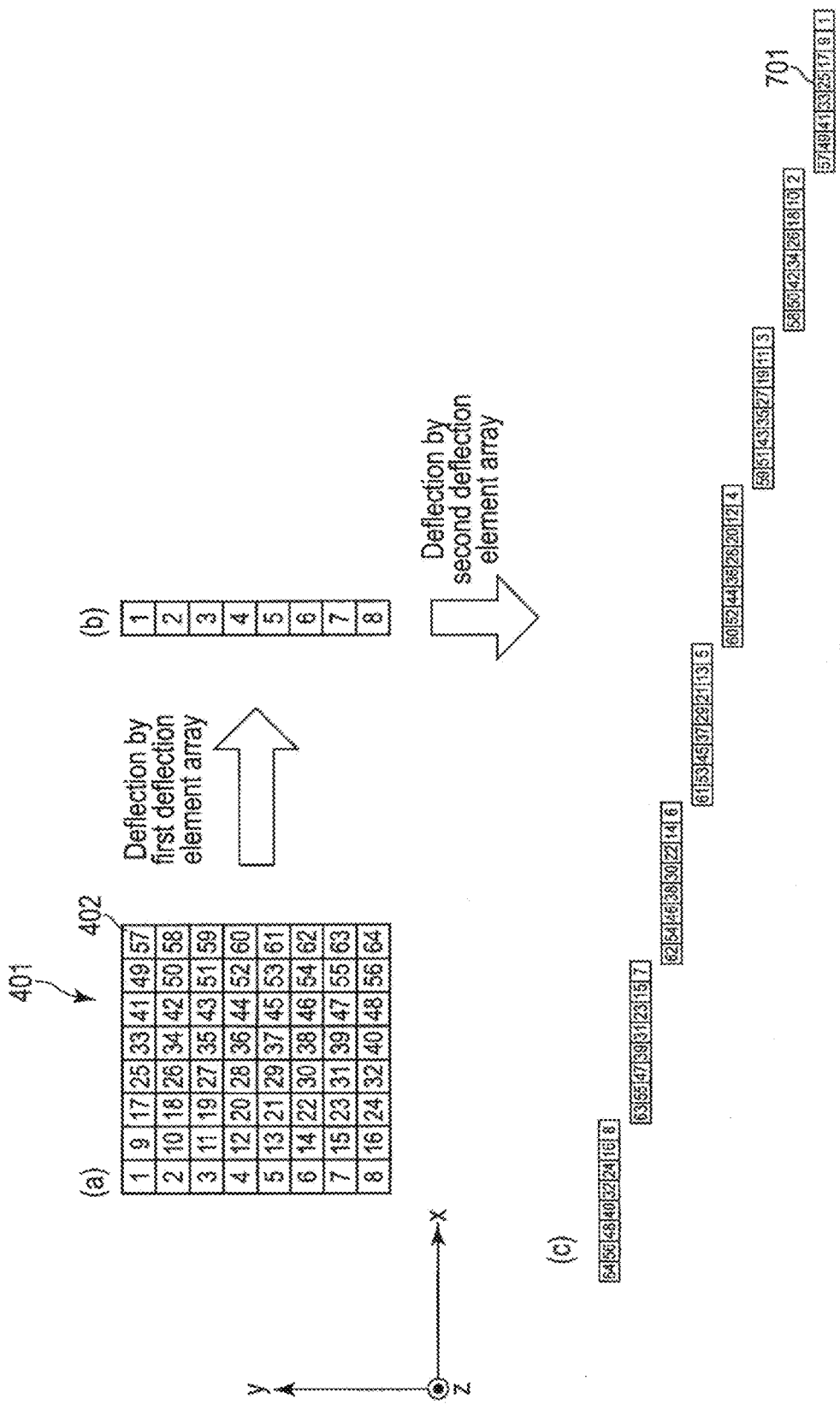
FIG. 7 is a diagram showing the deflected states of the modulated pixels by the first deflection element array and the second deflection element array.

FIG. 7 shows the deflected states of the beams of the modulated pixels arrayed in 8 rows×8 columns in one display pixel when viewed from the light traveling direction (the direction in which the user views a video or the like, or the direction from the positive side to the negative side of the z-axis in FIG. 7). Note that the size, angle, and aspect ratio of each pixel in the deflected states of the modulated pixels are different from those of an actual pixel.

In FIG. 7, (a) shows the alignment of the beams of modulated pixels in 8 rows×8 columns at the positions where the beams enter a first deflection element.

In FIG. 7, (b) shows the alignment of first deflected beams, which have entered the first deflection element and passed through the first deflection element with the alignment of the modulated pixel beams indicated by (a) of FIG. 7, at the positions where the beams enter a second deflection element. As indicated by (b) of FIG. 7, the pixels overlap horizontally to form one vertical column (8 rows×1 column). For example, the beams of modulated pixels numbers 1, 9, 17, 25, 33, 41, 49, and 57, which form the uppermost row of numbers in (a) of FIG. 7, overlap at the position of number 1. Similarly, the beams of modulated pixels numbers 8, 16, 24, 32, 40, 48, 56, and 64 in (a) of FIG. 7 overlap at the position of number 8. If the shift is uniform and the numerical order does not change, the beams may overlap with a shift. If a shift occurs, the shift amount is preferably as small as possible.

In FIG. 7, (c) shows the alignment of the modulated pixel beams (second deflected beams), which have passed through the second deflection element, at the positions where the beams enter the diffusion unit 105.

The second deflected beams that have passed through the second deflection element array 104 are deflected and given different output angles for each row. That is, the eight modulated pixel beams at the position of number 1 in (b) of FIG. 7 are deflected to the rightmost position of (c) of FIG. 7 by the second deflection element. Since the second deflection element is arranged at a tilt angle of 45° with respect to the generating line of the first deflection element, the beams are also deflected vertically at the same angle as they are horizontally. Hence, the pixel positions are vertically reversed, and the beams exit in the lowermost one of all the rows of the modulated pixels. In addition, the modulated pixel beams at the position of number 1 in (b) of FIG. 7 have been given a horizontal (x-axis direction) angular difference by the first deflection element. Hence, the beams exit at the exit positions of the second deflection element while having a horizontal angle (x-axis direction in FIG. 7) corresponding to the angular difference. That is, in (c) of FIG. 7, in a modulated pixel group 701 in 1 row×8 columns at the lower right position, the modulated pixel beams are arranged as 1, 9, 17, 25, 33, 41, 49, and 57 sequentially from right to left.

As described above, each second deflected beam that exits from the second deflection element array 104 has an output angle corresponding to the relative positions of the modulated pixel beam of the first deflected beam that has entered and the second deflection element included in the second deflection element array, and the incidence angle of the modulated pixel beam that has entered. For example, in this embodiment, the beams of modulated pixels 1 to 64 exit from one display pixel while sequentially changing the angle, and 64 parallaxes are generated. Note that normally, since the beams are also vertically deflected by the second deflection element array 104, the modulated pixel beams need to be diffused vertically by the diffusion unit 105. The performance required of the diffusion unit 105 may be low, by setting, lenticular lens having a horizontal (x-axis direction) generating line etc., between the second deflection element array 104 and the diffusion unit 105 and thus canceling the vertical deflection.

Figure 8:
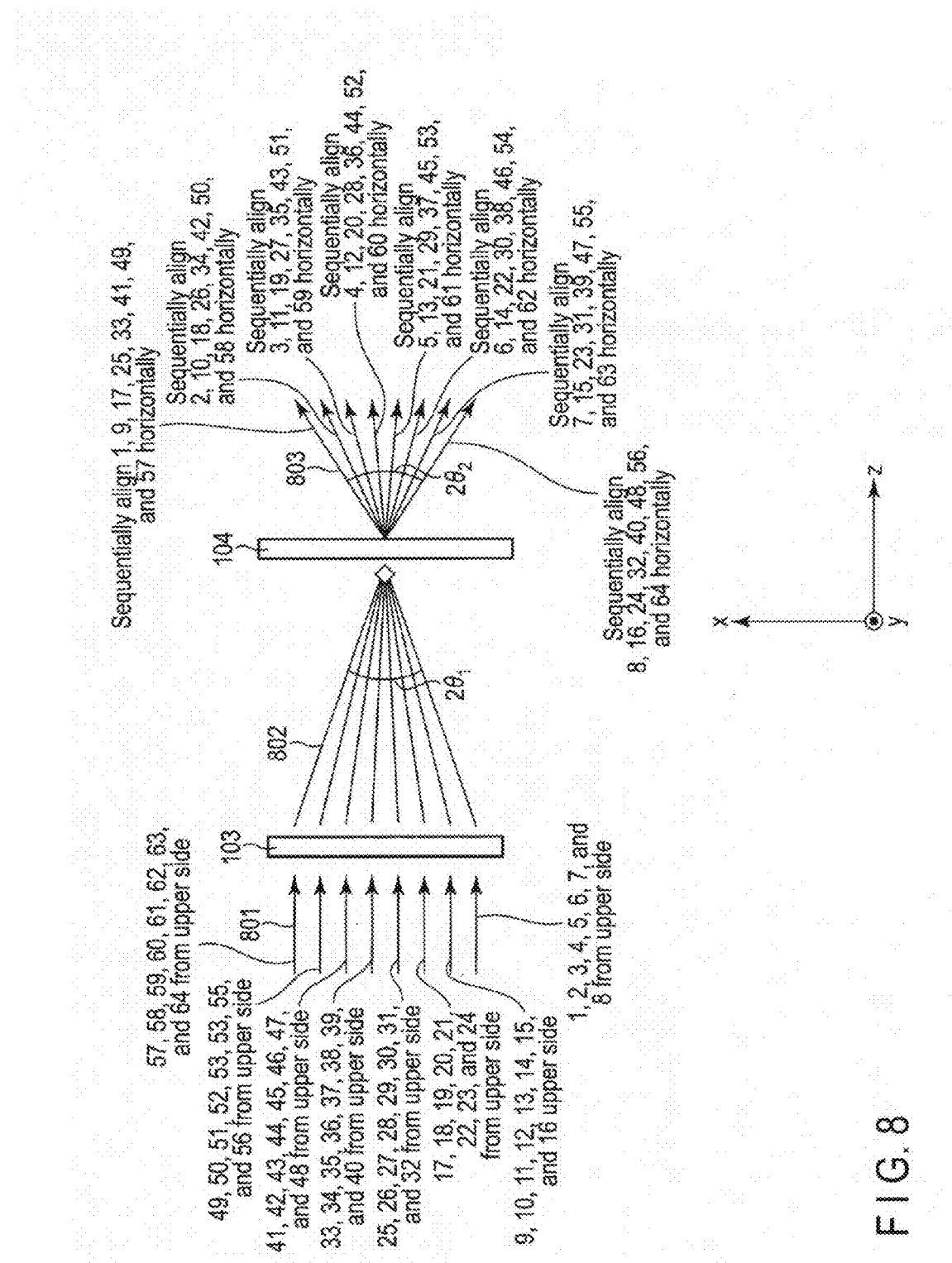
FIG. 8 is a diagram showing the deflected states of the modulated pixels by the first deflection element array and the second deflection element array viewed from another direction.

FIG. 8 illustrates the deflected states of the modulated pixels by the first deflection element array 103 and the second deflection element array 104 viewed from the y-axis direction.

Referring to FIG. 8, arrows 801 on the leftmost side vertically (y-axis direction) correspond to the center lines of the modulated pixel beams indicated by (a) of FIG. 7. That is, the beams of the rightmost column in (a) of FIG. 7 are aligned at the position of the uppermost arrow (modulated pixels numbers 57 to 64) in FIG. 8.

Arrows 802 indicate the center lines of the modulated pixel beams of the respective columns when the modulated pixel beams indicated by the arrows 801 have passed through the first deflection element array 103. Each arrow 802 represents that the modulated pixel beams of eight columns overlap at the position of one number. This corresponds to the state indicated by (b) of FIG. 7. Arrows 803 indicate the intermediate lines of the modulated pixels of the respective columns when the modulated pixel beams indicated by the arrows 802 have passed through the second deflection element array 104. More specifically, for example, the uppermost arrow 803 represents the intermediate line (the intermediate line between 25 and 33) of the modulated pixels (1, 9, 17, 25, 33, 41, 49, and 57). Similarly, the second arrow 803 from the upper side represents the intermediate line between 26 and 34 of the modulated pixels from number 2 to number 58.

Note that to array the beams horizontally at a predetermined interval without leaving a gap, as indicated by (c) of FIG. 7, considering that the first deflection element included in the first deflection element array 103 and the second deflection element included in the second deflection element array 104 are equivalent to a lens, the horizontal numerical aperture (NA) needs to satisfy $$\sin^{-1}(NA_1) \times (n-1) = \sin^{-1}(NA_2) \quad (3)$$

where $NA_1$ is the numerical aperture based on the outermost beam center of the modulated pixel beams that enter the first deflection element included in the first deflection element array 103, $NA_2$ is the numerical aperture based on the outermost beam center of the modulated pixel beams that enter the second deflection element included in the second deflection element array 104, and n is the number of rows of the beams of the modulated pixels in n rows×m columns. In this embodiment, n=8.

An explanation will be made assuming the angles shown in FIG. 8. The deflection elements of the first deflection element array and the second deflection element array have the relationships represented by $$\theta_1 = \sin^{-1}(NA_1) \quad (4)$$

$$\theta_2 = \sin^{-1}(NA_2) \quad (5) \text{ and,}$$

$$\theta_1 \times 7 = \theta_2 \quad (6)$$

Note that if a shift occurs in equation (3) with an equal sign, that is, if $$\sin^{-1}(NA_1) \times (n-1) < \sin^{-1}(NA_2) \quad (7)$$

is satisfied, the horizontal angular interval of the modulated pixel beams is partially too wide. Conversely, if $$\sin^{-1}(NA_1) \times (n-1) > \sin(NA_2) \quad (8)$$

is satisfied, the horizontal angular interval of the modulated pixel beams is partially too narrow. In any case, a shift of $2\theta_1/(n-1)$ or less is allowable because the interval of the modulated pixel beams never problematically becomes as wide as one pixel or more, or the alignment order of adjacent modulated pixel beams never problematically reverses.

When an FPD as shown in FIG. 1 or a projector as shown in FIG. 3 is used, a lens, a Fresnel lens, a prism, or the like is provided between the first deflection element array 103 and the light modulation unit 102 or between the light source 101 and the light modulation unit 102. This makes it possible to set the incidence angle to become larger as the distance from the screen center increases and, when generating parallaxes, optimize the field of vision by aligning toward the screen center.

Especially, when a projector as shown in FIG. 3 is used, the incidence angle of the beam that enters the first deflection element array 103 may change depending on the position of the modulated pixel. Hence, it may be difficult to appropriately perform parallax generation. In this case as well, a lens, a Fresnel lens, a prism, or the like is provided between the first deflection element array 103 and the light modulation unit 102. This makes it possible to obtain a predetermined incidence angle independently of the position of the modulated pixel or set the incidence angle to become larger as the distance from the screen center increases. As a result, it is possible to appropriately perform parallax generation regardless of the pixel position and maximize the field of vision by aligning toward the screen center.

In addition, the positional relationship between the light modulation unit 102, the first deflection element array 103, and the second deflection element array 104 may be adjusted to be shifted for each display pixel in accordance with the distance from the screen center. The shape of the lens or prism of the first deflection element array 103 and the second deflection element array 104 may be adjusted in accordance with the distance from the screen center. The same effects as described above can be obtained even by this adjustment. Note that when a Fresnel lens is used between the first deflection element array 103 and the light modulation unit 102, the boundary between the deflection elements of the Fresnel lens and the boundary between the display pixels are preferably made to match. This allows to prevent any disadvantage of observing the division boundary of the Fresnel lens and causing the user to have a sense of incongruity.

According to the above-described first embodiment, the first deflection element array having a generating line parallel to the boundary between the modulated pixels and the second deflection element array having a generating line tilted by an angle represented by $\tan^{-1}(m/n)$ with respect to the generating line of the first deflection element based on the modulated pixels in n rows×m columns included in one display pixel are provided. The modulated pixel beams pass through the first deflection element array and the second deflection element array in this order, thereby easily displaying an ultra multi-parallax 3D image at a low cost.

Second Embodiment

The second embodiment is different from the first embodiment in that second deflection elements each having a generating line serrated (zigzagging) at a period corresponding to two display pixels are juxtaposed as a second deflection element array. This makes it possible to decrease the horizontal compression of pixels. It is therefore possible to easily generate an ultra multi-parallax 3D image at a low cost in accordance with the design specifications of the image display apparatus.

The positional relationship between the second deflection element array and first deflected beams that have passed through the first deflection element array according to the second embodiment will be described with reference to FIG. 9.

The first deflection element array is almost the same as in the first embodiment except that the degree of horizontal compression of modulated pixels is low. As shown in FIG. 9, the width of modulated pixels 901 is compressed by the first deflection element array. Unlike the first deflection element array 103 according to the first embodiment in which the modulated pixels overlap to form one vertical column, each modulated pixel 901 is compressed horizontally in order to be smaller. Note that although the modulated pixels do not overlap in FIG. 9, they may be compressed horizontally to overlap.

The second deflection element array is a lenticular lens formed by juxtaposing a plurality of second deflection elements 902 each having a generating line tilted with respect to that of the first deflection element array. The generating line of the second deflection element is not a straight line in one direction but a line whose direction switches for each display pixel 401. That is, in the example shown in FIG. 9, the generating line of the second deflection element 902 is serrated by inverting the angle as $\theta_r \to -\theta_r \to \theta_r$ for each display pixel 401 vertically (y-axis direction). The period of switching the direction of the generating line of the second deflection element 902, that is, the zigzag period corresponds to two display pixels 401 vertically.

Assume that one display pixel is formed from modulated pixels in n rows×m columns, letting w be the width of the first deflected beams (64 modulated pixels 901) that correspond to one display pixel 401 and enter the second deflection element array, and p be the width of one second deflection element 902. In this case, the generating line of the second deflection element 902 need only tilt with respect to the generating line of the first deflection element by the angle $\theta_r$ given by $$\theta r \leq \tan^{-1}\{m \times (p-w)/(n \times p)\} \quad (9)$$

If the angle satisfies inequality (9), the modulated pixels 901 never overlap the boundary lines between the cylindrical lenses included in the second deflection element array, and it is possible to prevent the beams that have exited from becoming stray light and degrading the image quality or stereoscopic effect or causing color misregistration or unevenness. Note that m=n is more preferable because the display pixel interval can be made equal to the modulated pixel interval in the vertical and horizontal directions.

According to the above-described second embodiment, the second deflection element array has a zigzag shape at a period corresponding to the size of the display pixel. This makes it possible to effectively use all modulated pixels and easily display an ultra multi-parallax 3D image at a low cost in accordance with the design specifications of the image display apparatus.

First Modification of Embodiments

In the first modification, switching between a 2D image and a 3D image is done using a liquid.

Figure 10:
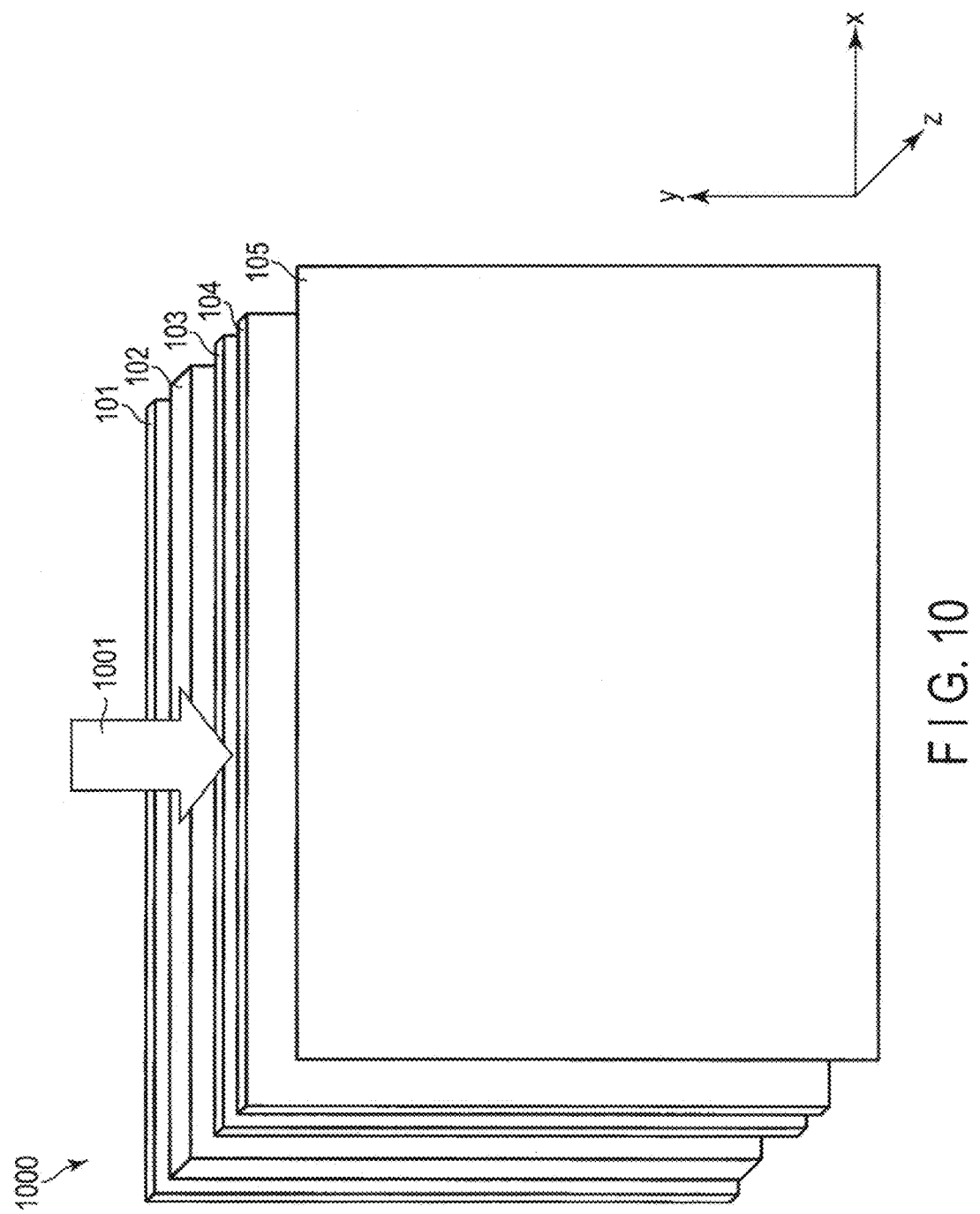
FIG. 10 is a diagram showing an image display apparatus according to the first modification.

An image display apparatus according to the first modification will be described with reference to FIG. 10.

In an image display apparatus 1000 according to the first modification, both a first deflection element array 103 and a second deflection element array 104 have a flat surface and a concave/convex surface. The first deflection element array 103 and the second deflection element array 104 are arranged such that their concave/convex surfaces face each other. When a substance having a refractive index equal to that of the material of the first deflection element array 103 and the second deflection element array 104 is put into a gap 1001 between them, the optical deflection effect of the two deflection element arrays can be eliminated. That is, putting the substance makes it possible to eliminate the parallax generation effect and switch between a so-called 2D image and a 3D image. The substance put into the image display apparatus 1000 is, for example, a liquid. Silicone oil, so-called optical oil (immersion oil) used in oil immersion of an optical microscope, glycerin, or anisole is inserted into the gap 1001. Note that instead of making the concave/convex surfaces face each other, concave/concave surfaces or convex/convex surfaces may be made to face each other.

According to the above-described first modification, it is possible to easily switch between a 2D image and a 3D image.

Second Modification of Embodiments

In the above-described embodiments, the first deflection element array and the second deflection element array are assumed to be separate sheets. In the second modification, one sheet is formed to have the effect of the first deflection element array and the second deflection element array.

An image display apparatus according to the second modification will be described with reference to FIG. 11.

Figure 11:
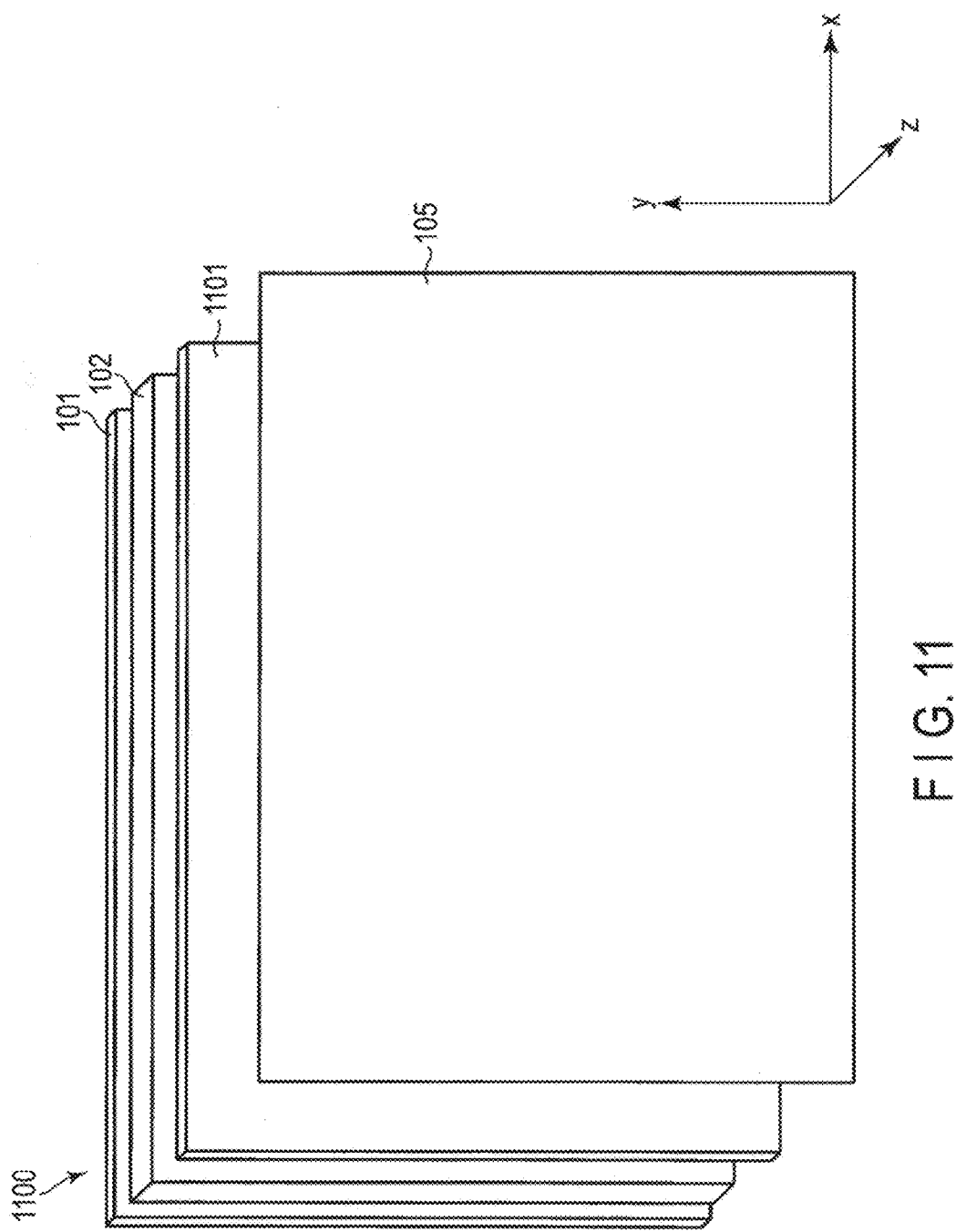
FIG. 11 is a diagram showing an image display apparatus according to the second modification.

In an image display apparatus 1100 according to the second modification, a concave/convex pattern is formed on both surfaces of a deflection element array 1101 shown in FIG. 11 to obtain the effect of the first deflection element array and the second deflection element array. With is arrangement, the positional relationship between the first deflection element array and the second deflection element array is decided when forming the concave/convex pattern on both surfaces of one sheet. It is therefore possible to adjust the positional relationship more easily than when separately forming the first deflection element array and the second deflection element array and adjusting the positional relationship therebetween, and reduce the load at the time of manufacturing.

According to the above-described second modification, a concave/convex surface is formed on both surfaces of one sheet to have the effect of the first deflection element array and the second deflection element array. This allows to simplify the arrangement of the image display apparatus and reduce the cost.

Third Modification of Embodiments

Even when the above-described first deflection element array compresses the width of the modulated pixels for each display pixel, light may leak in an unexpected direction to generate stray light and degrade the display quality. In such a case, a plurality of optical slits or iris are arranged in the gap between the first deflection element array and the second deflection element array for each vertical column of display pixels. This arrangement makes it possible to block stray light.

Figure 12:
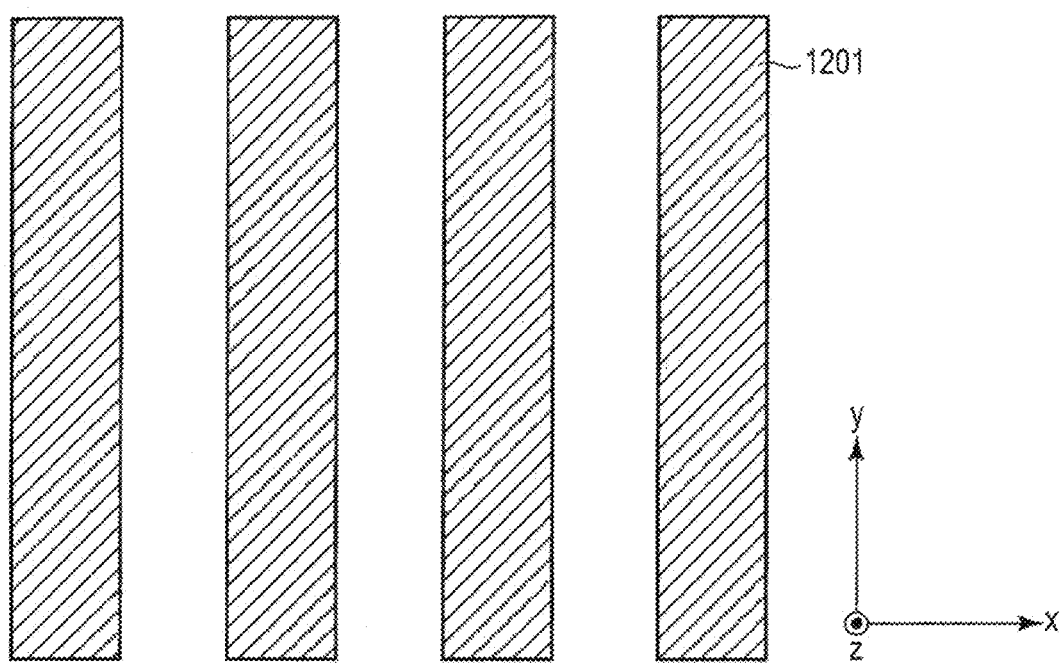
FIG. 12 is a diagram showing an example of slits used in an image display apparatus according to the third modification.

FIG. 12 shows an example of slits used in an image display apparatus according to the third modification.

Figure 9:
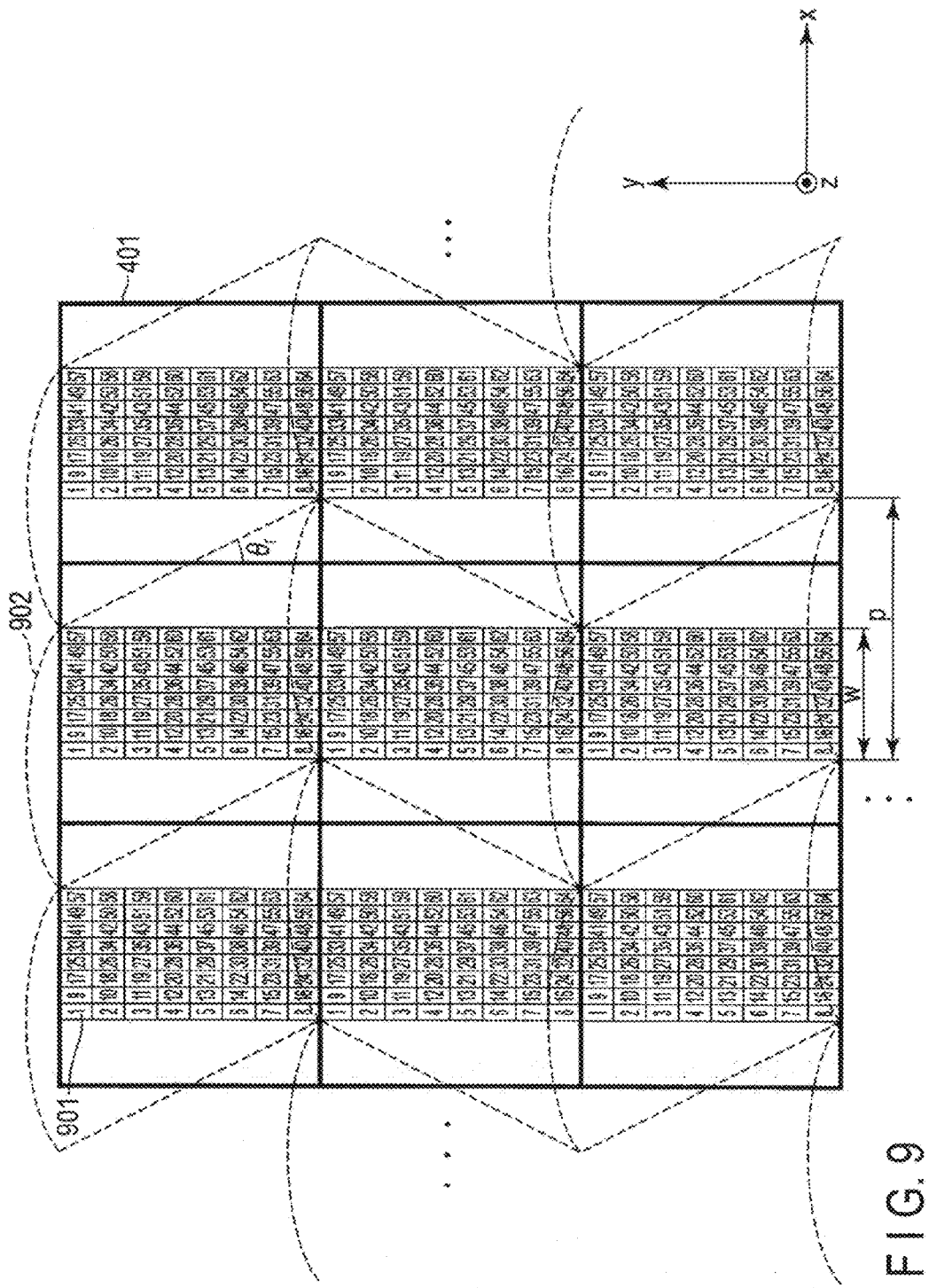
FIG. 9 is a diagram showing the positional relationship between modulated pixels and a first deflection element array according to the second embodiment.

As shown in FIG. 12, slit-shaped masks 1201 like vertical stripes are provided to block light that passes through, for example, regions without the modulated pixels 901 in FIG. 9. A partition plate for surrounding the region of each display pixel 401 may be used.

In addition, to reduce crosstalk between parallaxes and prevent adjacent parallax light components from being observed in an overlapping state, finer optical slits or irises may be inserted between the beams of the modulated pixels. "Between beams" means positions between numbers indicating the incidence positions of first deflected beams that enter the second deflection element array in FIG. 9. The larger the area to block the beams is, the lower the brightness of an observed image is. However, since the size of the modulated pixel beam can be made small, the crosstalk between parallaxes can be reduced accordingly.

According to the above-described third modification, it is possible to suppress stray light and reduce the crosstalk between parallaxes by using the slit-shaped masks or irises.

Fourth Modification of Embodiments

In the fourth modification, the number of parallaxes can be increased by arranging pixel shift elements capable of actively changing beam irradiation positions.

The pixel shift elements are arranged in the gap between the first deflection element array and the light modulation unit or between the first deflection element array and the second deflection element array. The pixel shift elements can quickly switch the positions of the modulated pixels. For example, assume a case in which the pixel shift elements are provided between a light modulation unit 102 and a first deflection element array 103. When the modulated pixel positions are shifted horizontally or vertical direction at an interval corresponding to ½ the modulated pixel interval, modulated pixel beams can further be made to enter, for example, between the numbers of the modulated pixels shown in FIG. 9, and the number of parallaxes can be almost doubled.

Figure 13:
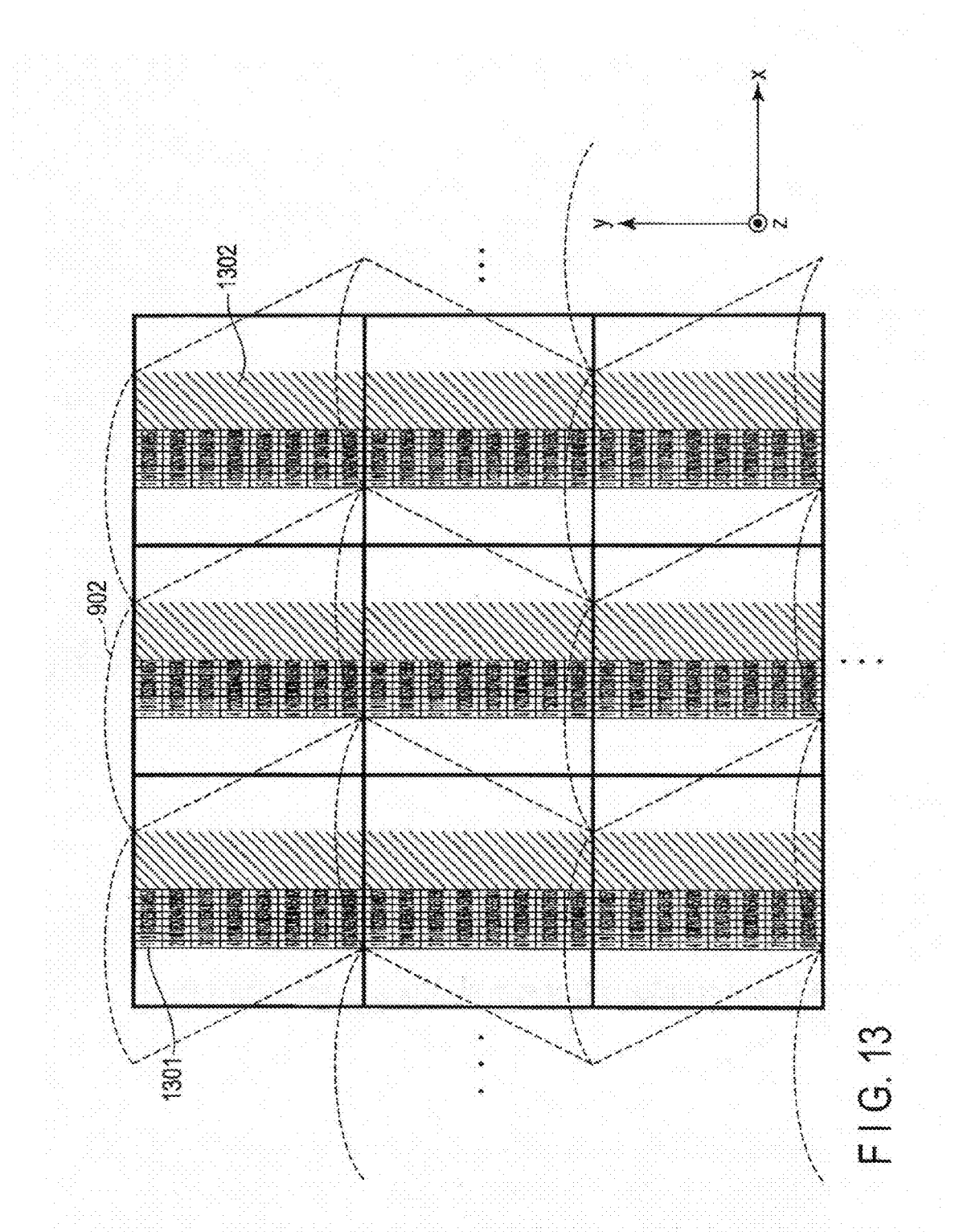
FIG. 13 is a diagram showing an example of setting the compression width of modulated pixels in an image display apparatus according to the fourth modification.

FIG. 13 shows an example of setting the compression width of modulated pixels according to the fourth modification. FIG. 13 illustrates the positonal relationship between the second deflection element array and first deflected beams that have passed through the first deflection element array and enter the second deflection element array. For modulated pixels 1301 shown in FIG. 13, the width of the first deflected beams (modulated pixels) is compressed by the first deflection element array at a twice higher degree of compression for each display pixel. In addition, the beam positions are shifted by the pixel shift elements by a distance equal to the compressed width. In this case, when the beams of the modulated pixels 1301 also enter hatched regions 1302 in FIG. 13, the number of parallaxes can be doubled. However, it is necessary to do switching at a frequency twice higher than the frame rate (the number of frames displayed per second) to be displayed.

The pixel shift element can have various arrangements. FIGS. 14 and 15 show different examples of the pixel shift element. As the first example of the arrangement of the pixel shift element, as shown in FIG. 14, an element that translates the optical path of a modulated pixel beam by changing the angle of a parallel plate 1401 may be used.

As the second example of the arrangement of the pixel shift element, as shown in FIG. 15, an element generally called a polarization integrator 1500 that translates the optical path using polarization may be used. More specifically, a retarder 1501 switches the beam to s- or p-polarized light. A polarized beam splitter 1502 directly passes p-polarized light and reflects s-polarized light, thereby switching the optical path of the beam. Especially, the polarization integrator 1500 is advantageous in having no movable portion. Note that an element such as a voice coil or piezoelectric actuator for oscillating the light modulation unit 102 itself may be used as the pixel shift element.

According to the above-described fourth modification, the number of parallaxes can be increased by arranging the pixel shift elements.

In the above-described embodiments, when each modulated pixel is separated into RGB for color display, and projector type projection as shown in FIG. 3 is used, the RGB components of the modulated pixel preferably overlap coaxially. However, the RGB components may be shifted if adjacent modulated pixels do not overlap each other. To prevent the user from observing color misregistration or unevenness, each modulated pixel is formed into an oblique shape such that the RGB components of one modulated pixel are always observed simultaneously.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display apparatus for displaying an ultra multi-parallax three-dimensional image, comprising:
   a light source emitting light;
   a modulation unit configured to modulate an intensity of the light and a color of the light to generate beams corresponding to each of modulated pixels included in a modulated pixel group, the modulated pixels each being determined by an observation position where an image is observed and an output angle corresponding to the observation position, the modulated pixel group being the modulated pixels arrayed two-dimensionally;
   a first array formed by juxtaposing a plurality of first deflection elements each having a generating line parallel to a vertical direction of the modulated pixels and configured to deflect the beams for each first modulated pixel group corresponding to m columns in the modulated pixel group to generate first deflected beams, the m being a natural number; and
   a second array formed by juxtaposing a plurality of second deflection elements each having a generating line tilted by an angle represented by $\tan^{-1}(\alpha \times m/n)$ with respect to a generating line of the first deflection element and configured to deflect the first deflected beams for each second modulated pixel group corresponding to n rows in the first modulated pixel group to generate second deflected beams with changed alignments of the modulated pixels, the $\alpha$ being a ratio of a horizontal pixel interval to a vertical pixel interval of each modulated pixel, the n being a natural number.

2. The apparatus according to claim 1, wherein the first array and the second array satisfy $$\sin^{-}(NA_1) \times (n-1) = \sin^{-1}(NA_2)$$

for the first deflected beam corresponding to the n rows, $NA_1$ being a numerical aperture of the first array, $NA_2$ being a numerical aperture of the second array.

3. The apparatus according to claim 1, wherein the m is equal to the n.

4. The apparatus according to claim 1, wherein the first array and the second array are formed from one of a cylindrical lens, a prism, and a diffraction grating.

5. The apparatus according to claim 1, wherein the first array and the second array are formed from flat plates having the first deflection elements arranged on a first surface and the second deflection elements arranged on a second surface facing the first surface.

6. The apparatus according to claim 1, further comprising a material having a refractive index equal to a first refractive index of the first array and a second refractive index of the second array and put into a gap between the first array and the second array.

7. The apparatus according to claim 1, further comprising one of an optical slit and a iris arranged to a gap between the first array and the second array.

8. The apparatus according to claim 1, further comprising a diffusion unit configured to adjust a diffusion angle of the second deflected beams to generate a parallax image at the observation position by the second deflected beams.

9. An image display apparatus for displaying an ultra multi-parallax three-dimensional image, comprising:
   a light source emitting light;
   a modulation unit configured to modulate an intensity of the light and a color of the light to generate beams corresponding to each of modulated pixels included in a modulated pixel group, the modulated pixels each being determined by an observation position where an image is observed and an output angle corresponding to the observation position, the modulated pixel group being the modulated pixels arrayed two-dimensionally;
   a first array formed by juxtaposing a plurality of first deflection elements each having a generating line parallel to a vertical direction of the modulated pixels and configured to deflect the beams for each first modulated pixel group corresponding to m columns in the modulated pixel group to generate first deflected beams, the m being a natural number; and
   a second array formed by juxtaposing a plurality of second deflection elements each having a serrated generating line tilted by a first angle with respect to a generating line of the first deflection element and inverting the tilt of the first angle in every n rows and configured to deflect the first deflected beams for each second modulated pixel group corresponding to n rows in the first modulated pixel group to generate second deflected beams with changed alignments of the modulated pixels, the n being a natural number.

10. The apparatus according to claim 9, wherein if a width of each of the first deflected beams is defined as w, and a width of the second deflection element as p, the first angle is given by $$\theta r \leq \tan^{-1}\{m \times (p-w)/(n \times p)\}.$$

11. The apparatus according to claim 9, further comprising a pixel shift element arranged in a gap between the modulation unit and the first array and configured to change an irradiation position of the light and an angle of the light, or arranged in a gap between the first array and the second array and configured to change an irradiation position of the first deflected beams and an angle of the first deflected beams,
   wherein the first array adjusts a width of the first deflected beam in accordance with the pixel shift element.

12. The apparatus according to claim 9, wherein the m is equal to the n.

13. The apparatus according to claim 9, wherein the first array and the second array are formed from one of a cylindrical lens, a prism, and a diffraction grating.

14. The apparatus according to claim 9, wherein the first array and the second array are formed from flat plates having the first deflection elements arranged on a first surface and the second deflection elements arranged on a second surface facing the first surface.

15. The apparatus according to claim 9, further comprising a material having a refractive index equal to a first refractive index of the first array and a second refractive index of the second array and put into a gap between the first array and the second array.

16. The apparatus according to claim 9, further comprising one of an optical slit and a iris arranged to a gap between the first array and the second array.

17. The apparatus according to claim 9, further comprising a diffusion unit configured to adjust a diffusion angle of the second deflected beams to generate a parallax image at the observation position by the second deflected beams.

* * * * *